(12) United States Patent
Tischendorf et al.

(10) Patent No.: US 8,623,217 B2
(45) Date of Patent: Jan. 7, 2014

(54) METHOD FOR WATER TREATMENT REGENERATION STAGE

(71) Applicant: Pentair Residential Filtration, LLC, Minneapolis, MN (US)

(72) Inventors: Andrew Tischendorf, Campbellsport, WI (US); Michael M. Lindfors, Whitefish Bay, WI (US); Kyle Paull, Thiensville, WI (US)

(73) Assignee: Pentair Residential Filtration, LLC, Minneapolis, MN (US)

( * ) Notice: Subject to any disclaimer, the term of this patent is extended or adjusted under 35 U.S.C. 154(b) by 0 days.

(21) Appl. No.: 13/951,822

(22) Filed: Jul. 26, 2013

(65) Prior Publication Data
US 2013/0306578 A1 Nov. 21, 2013

Related U.S. Application Data

(62) Division of application No. 12/697,949, filed on Feb. 1, 2010, now Pat. No. 8,500,999.

(51) Int. Cl.
*B01D 24/46* (2006.01)

(52) U.S. Cl.
USPC .......................................... 210/722; 210/758

(58) Field of Classification Search
USPC .................................................. 210/722, 758
See application file for complete search history.

(56) References Cited

U.S. PATENT DOCUMENTS 5,919,373 A * 7/1999 Naaktgeboren ............... 210/750

* cited by examiner

*Primary Examiner* — Chester Barry
(74) *Attorney, Agent, or Firm* — Greenberg Traurig LLP

(57) ABSTRACT

Embodiments of the invention provide a method and system for providing a regeneration stage in a water treatment system. The method can include entering a first air bleed state to allow pressurized, deoxygenated air to exit the water treatment system, entering a second air bleed state to equalize a first air pressure of remaining deoxygenated air inside the water treatment system with a second air pressure outside the water treatment system, entering a backwash state to expel remaining deoxygenated air and particulates from inside the water treatment system, and entering an air draw state to allow oxygenated air to enter the water treatment system.

6 Claims, 10 Drawing Sheets

METHOD FOR WATER TREATMENT REGENERATION STAGE

RELATED APPLICATIONS

This application is a divisional of U.S. patent application Ser. No. 12/697,949, entitled "System and Method for Water Treatment Regeneration Stage", by Andrew Tischendorf et al. filed Feb. 1, 2010, now U.S. Pat. No. 8,500,999, which is hereby incorporated by reference herein in its entirety.

BACKGROUND

Water treatment systems, such as mineral removal systems (e.g., iron, sulfide, and manganese) and/or water softener systems, are used to treat water in businesses, industries, and homes. Conventional water treatment systems include tanks into which untreated water flows and is forced to mix with oxygenated air. Ions in the untreated water can become oxidized by the oxygenated air, resulting is solid particulates. The untreated water can then pass through a resin bed. The resin bed can allow treated water to pass, while trapping the solid particulates. This process creates a pressure buildup inside the tank. As a result, when the tank is opened to the atmosphere, deoxygenated air can rapidly evacuate the tank. This rapid evacuation of air can jar pipes and other components, resulting in noisy water treatment systems.

SUMMARY

Some embodiments of the invention provide a method for a regeneration stage in a water treatment system. The method can include entering a first air bleed state for a first time period to allow pressurized, deoxygenated air to exit the water treatment system, and entering a second air bleed state for a second time period to equalize a first air pressure of remaining deoxygenated air inside the water treatment system with a second air pressure outside the water treatment system. The method can also include entering a backwash state for a third time period to expel remaining deoxygenated air and particulates from inside the water treatment system, and entering an air draw state for a fourth time period to allow oxygenated air to enter the water treatment system. In some embodiments, the method can be used in a water treatment system designed to remove iron, sulfide, and/or manganese from water.

DETAILED DESCRIPTION

Figure 1:
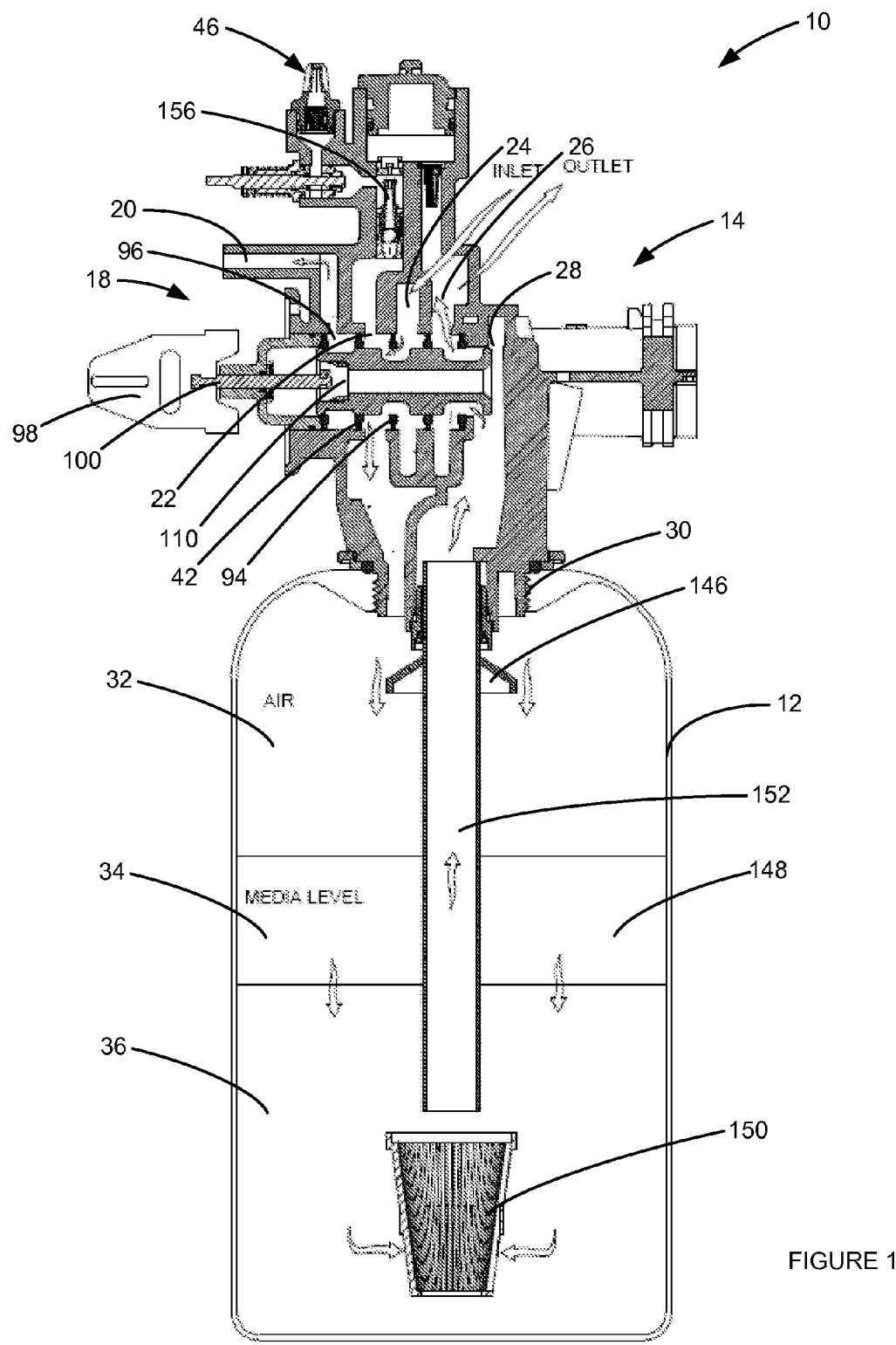
FIG. 1 is a cross-sectional view of a water treatment system, according to one embodiment of the invention, in a service state.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 8:
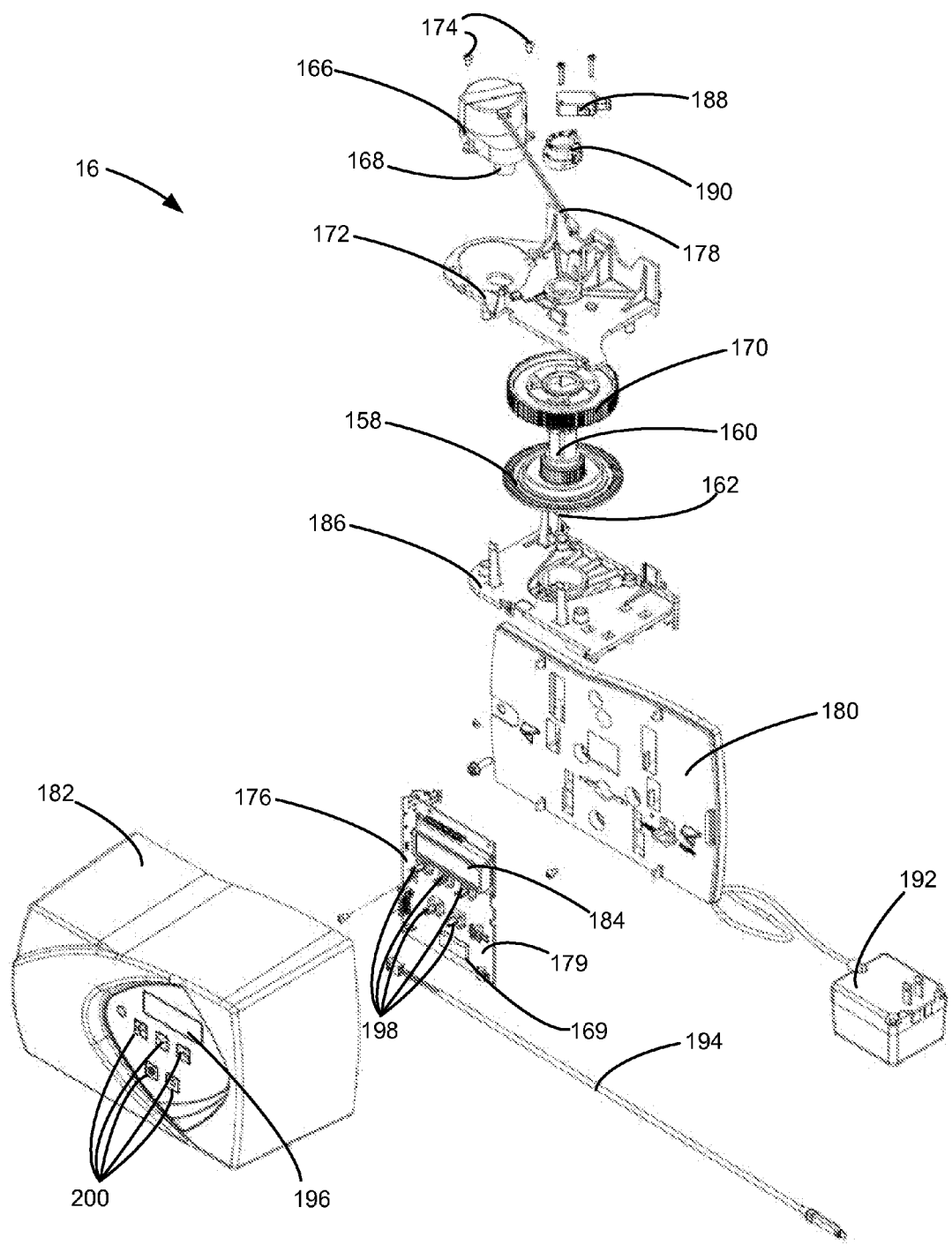
FIG. 8 is an exploded view of a powerhead of the water treatment system of FIG. 1.

FIG. 1 illustrates a water treatment system 10 according to one embodiment of the invention. The water treatment system 10 can be used commercially or residentially to remove iron, sulfide, and/or manganese, among other oxidizable minerals, in water. The water treatment system 10 can include a tank 12 and a head portion 14. The head portion 14 can include a powerhead 16 (as shown in FIG. 8), a valve assembly 18, and fluid ports 20-28. The fluid ports can include a drain 20, a top portion 22 of the tank 12, an inlet 24, an outlet 26, and a distributor 28. The head portion 14 can also include a threaded portion 30 for coupling the head portion 14 to the tank 12. In certain operational states, the tank 12 can include an air layer 32, a media layer 34, and a water layer 36.

Figure 2:
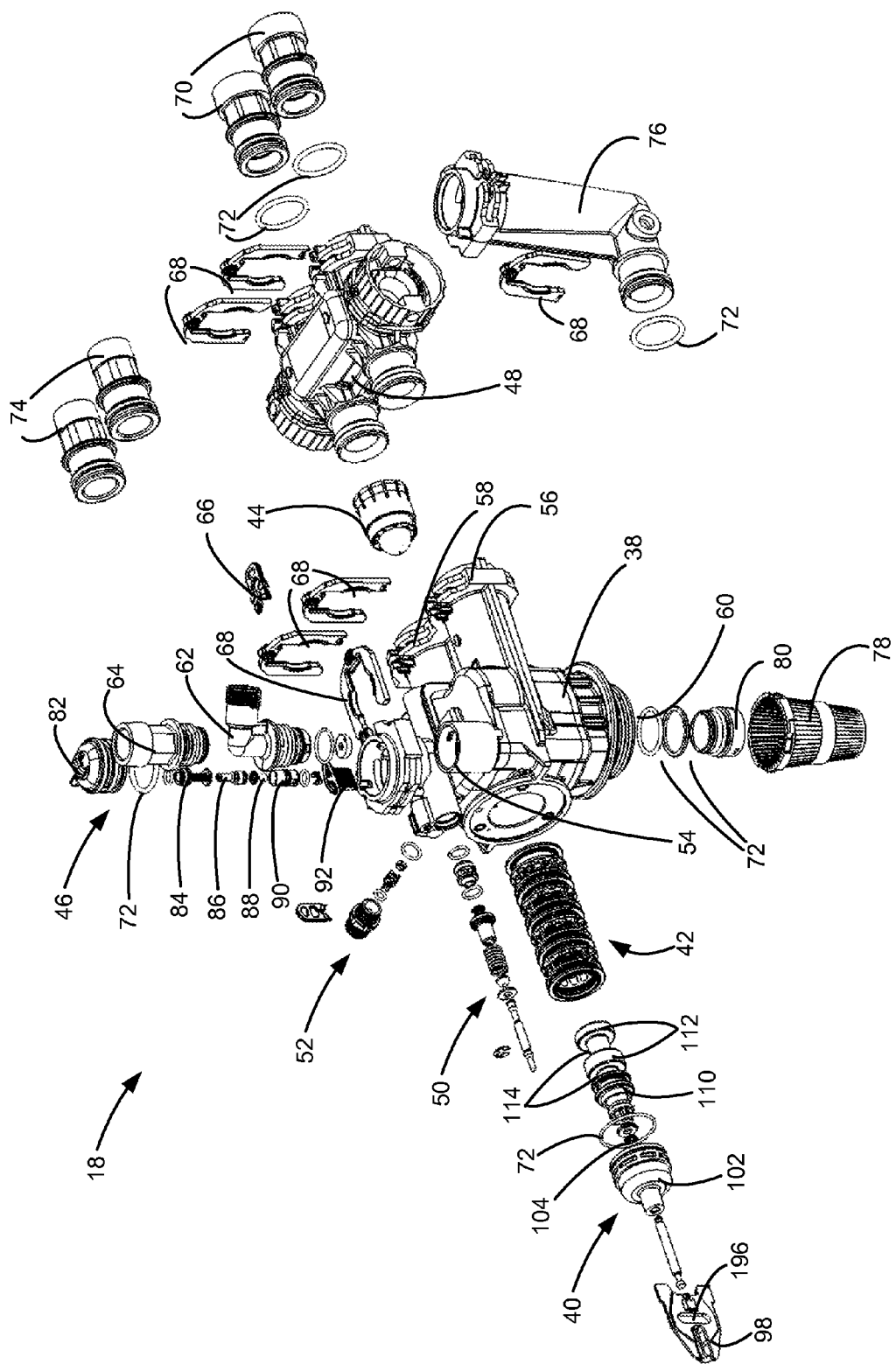
FIG. 2 is an exploded view of a valve assembly of the water treatment system of FIG. 1.

FIG. 2 illustrates the valve assembly 18 according to one embodiment of the invention. The valve assembly 18 can include a valve body 38, a piston assembly 40, a spacer assembly 42, a turbine meter assembly 44, an injector assembly 46, and a bypass assembly 48. In some embodiments, the water treatment system 10 can be used for water softening and the valve assembly 18 can also include a brine valve assembly 50 and a brine line flow control (BLFC) assembly 52.

The valve assembly 18 can also include a drain channel 54, an inlet channel 56, an outlet channel 58, and a distributor channel 60 in fluid communication with the drain 20, the inlet 24, the outlet 26, and the distributor 28, respectively. The drain channel 54 can be connected to piping (not shown) via a drain housing 62 or an alternate drain housing 64 with a drain retainer clip 66. The inlet channel 56 and the outlet channel 58 can be coupled to the bypass assembly 48 via H-clips 68. The bypass assembly 48 can further be coupled to connectors 70 via o-rings 72 and H-clips 68. In some embodiments, alternate connectors 74 or an elbow connector 76 (via an o-ring 72 and an H-clip 68) can be used in place of the connectors 70. The distributor channel 60 can be coupled to a first collector 78 via an adaptor 80 and o-rings 72. In addition, the injector assembly 46 can include an injector cap 82, an injector nozzle 84, an injector throat 86, a ball 88, a ball gage 90, an injector screen 92, and o-rings 72. The injector assembly 46 can be used to allow air to enter the valve assembly 18 and can be coupled to the valve body via an H-clip 68.

Figure 3:
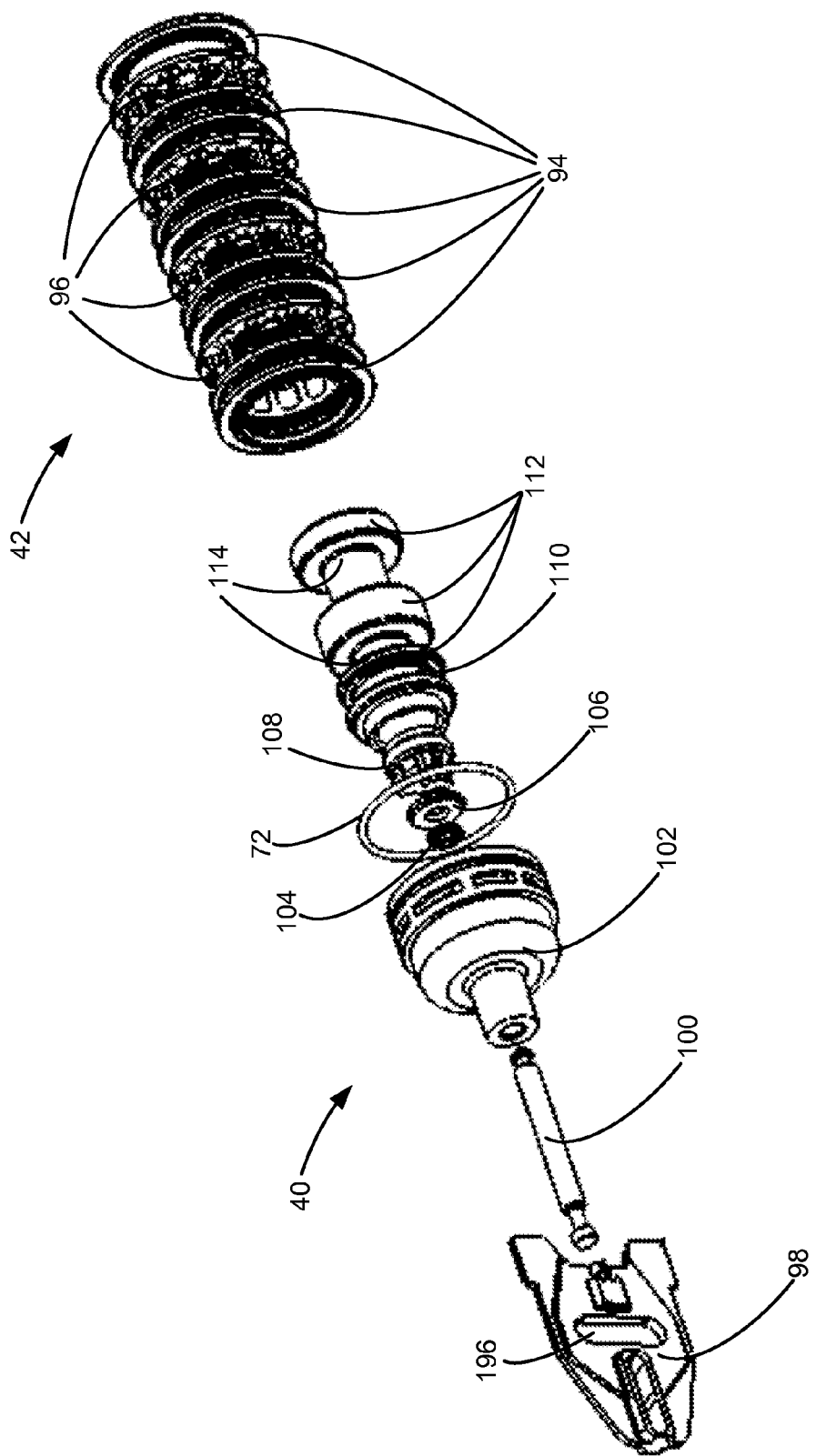
FIG. 3 is an exploded view of a piston assembly and a spacer assembly of the valve assembly of FIG. 2.

FIG. 3 illustrates the piston assembly 40 and the spacer assembly 42. As shown in FIG. 3, the spacer assembly 42 can include piston seals 94 separated by spacers 96. The piston seals 94 can be aligned between the fluid ports 18-26 in the valve body 38. The piston assembly 40 can include a link 98, a piston rod 100, an end plug 102, an o-ring 72, a quad ring 104, an end plug seal 106, a piston rod retainer 108, and a piston 110. The piston 110 can include large diameter sections 112 and small diameter sections 114. The large diameter sections 112 can engage the piston seals 94 to substantially seal fluid paths between one or more of the fluid ports 18-26, depending on the position of the piston 110 in the spacer assembly 42. In addition, the small diameter portions 114 can permit fluid paths between one or more of the fluid ports 18-26. The position of the piston 110 can affect an operational state of the water treatment system 10, as described below.

Figure 4:
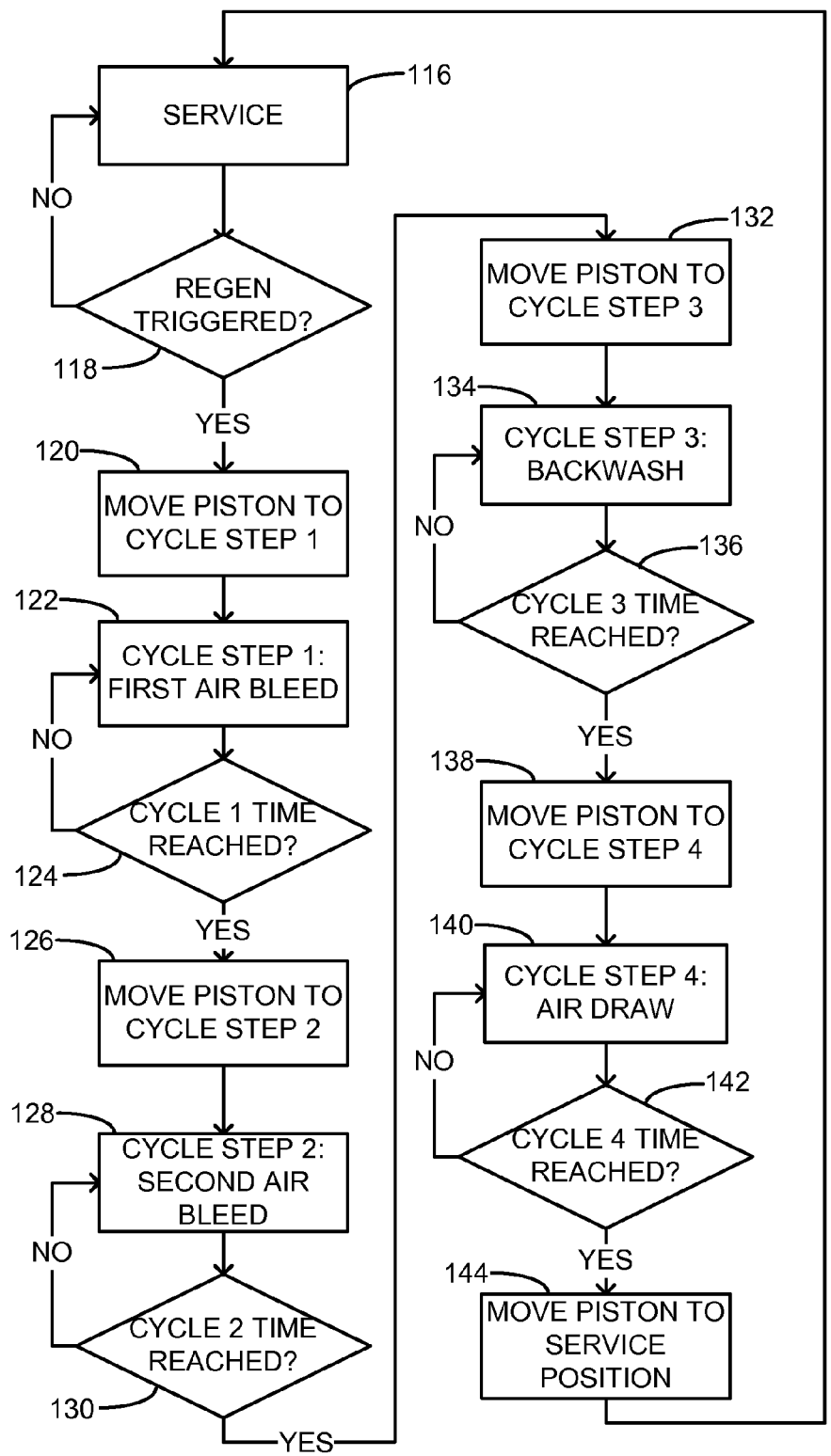
FIG. 4 is a flowchart illustrating operation of the water treatment system of FIG. 1 according to one embodiment of the invention.

FIG. 4 is a flowchart outlining the operation of the water treatment system 10 according to one embodiment of the invention. The water treatment system 10 can start in a service state at step 116 where the piston 110 is in a first position. If a regeneration stage is triggered in step 118, the piston 110 can be repositioned at step 120 so that the water treatment system 10 is in a first air bleed state at step 122. The water treatment system 10 can be in the first air bleed state (at step 122) until a time limit has been reached at step 124. The piston 110 can then be repositioned at step 126 so that the water treatment system 10 is in a second air bleed state at step 128. After another time limit at step 130, the piston 110 can be repositioned at step 132 so that the water treatment system 10 is in a backwash state at step 134. The water treatment system 10 can be in the backwash state (at step 134) until another time limit has been reached at step 136. Once the time limit has been reached at step 136, the piston 110 can again be repositioned at step 138 so that the water treatment system 10 is in an air draw state at step 140 for another time limit (at step 142). The piston 110 can then return to the first position at step 144 and the water treatment system 10 can again be in the service state at step 116. The time limits can be predefined and can differ from one another (as described below).

FIG. 1 illustrates the water treatment system 10 in the service state (i.e., at step 116 of FIG. 4). In the service state, the piston 110 can be positioned to the far right within the spacer assembly 42 such that untreated water can enter through the inlet 24, through the top portion 22, past a baffle 146, and enter the air layer 32 of the tank 12. The baffle 146 can disperse the untreated water into the air layer 32 to allow sufficient mixing of oxygen molecules in the air layer 32 with minerals (e.g., iron, sulfide, manganese, etc., in ion form) in the untreated water. By mixing with the oxygen molecules, the minerals can become oxidized and, as a result, become solid molecules or particulates. After passing through the air layer 32, the untreated water can reach the media layer 34. The media layer 34 can include a filtration media or resin 148, which can filter the solid particulates formed in the air layer 32 as well as any other particulates to allow treated water to pass to the water layer 36. The treated water can then pass through a second collector 150, up a distributor pipe 152, through the distributor 28, and out through the outlet 26. The second collector 150 can act as a screen to prevent the filtration media 148 from leaving the tank 12.

Figure 5:
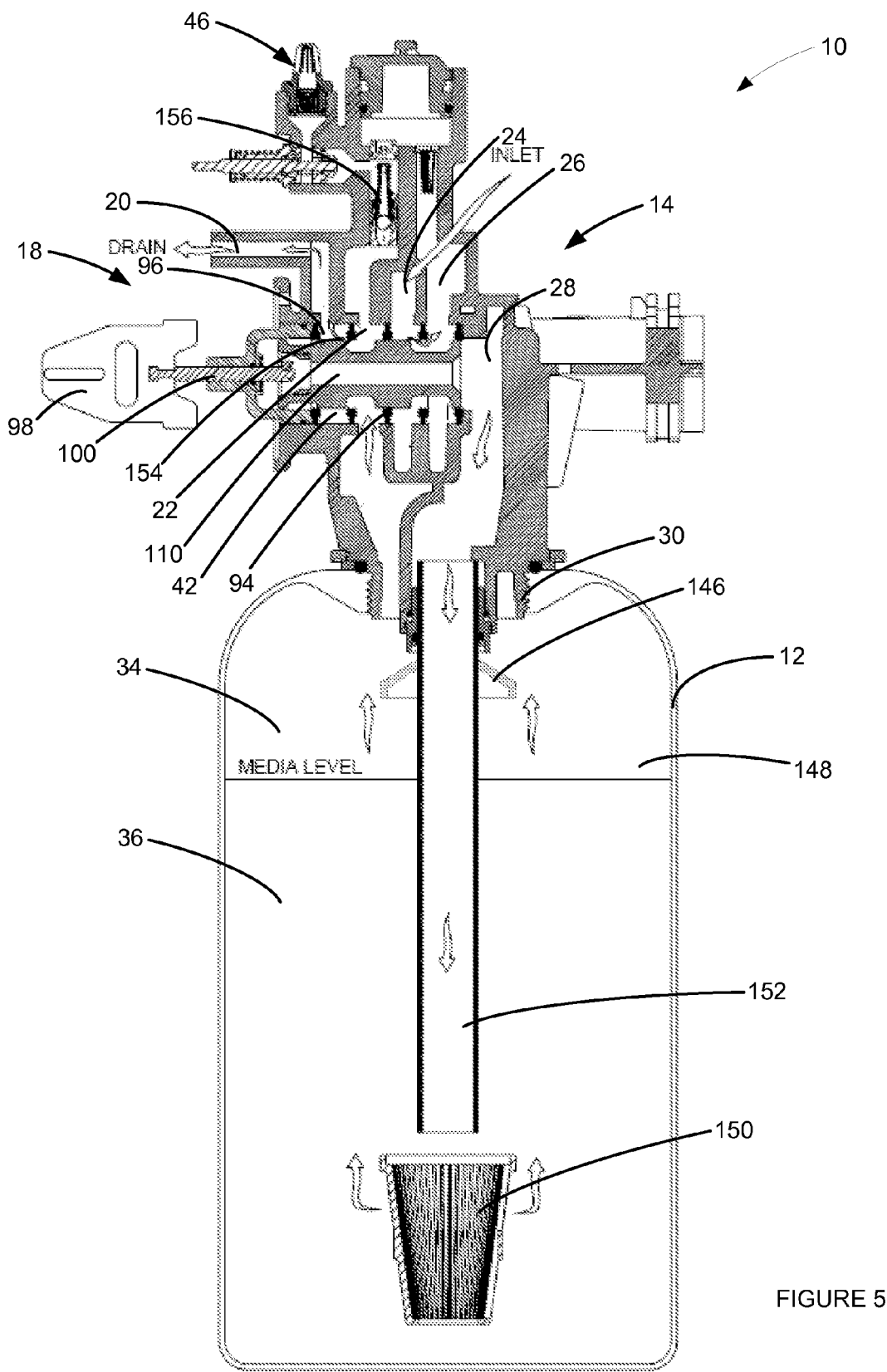
FIG. 5 is a cross-sectional view of the water treatment system of FIG. 1 in an air bleed state.

While in the service state, oxygen in the air layer 32 can become depleted due to the oxidation of the minerals. As a result, the water treatment system 10 can enter the regeneration stage to replenish the air layer 30. The regeneration stage can include the first air bleed state (i.e., step 122 of FIG. 4), the second air bleed state (i.e., step 128 of FIG. 4), the backwash state (i.e., step 134 of FIG. 4), and the air draw state (i.e., step 140 of FIG. 4). In the first air bleed state, as shown in FIG. 5, the piston 110 can be moved slightly to the left such that the top portion 22 is no longer in fluid communication with the inlet 24. The piston 110 can be positioned slightly offset from one of the piston seals 94 so that there is a small vent channel 154 between the top portion 22 and the drain 20, allowing air (i.e., pressurized air) to exit the tank 12 through the drain 20. In the second air bleed state, the piston 110 can again be moved to the left to further open the vent channel 154 and allow more air to leave the tank 12. Following the second air bleed state, any air still in the tank 12 can be at the same pressure as air outside the tank 12 (i.e., there is no longer a pressurized air head inside the tank 12). In some embodiments, the distance between the piston seal 94 and the piston 110 during the first air bleed can be in the range of about 0.01 inches to about 0.02 inches, creating a vent channel 154 with an area of about 0.05 square inches. The distance between the piston seal 94 and the piston 110 during the second air bleed can be greater than or equal to about 0.05 inches, creating a vent channel 154 with an area of about 0.1 square inches. These distances and areas have been found to provide effective air bleeding without adverse effects, such as noise and vibration.

While in the service state, the addition of untreated water can compress the air within the tank 12, creating the pressurized air head. If the piston 110 were to completely open a fluid path between the top portion 22 and the drain 20 during the regeneration stage, the pressurized air would rapidly evacuate the tank 12. This rapid evacuation of air can cause noise from the air flow itself and can also jar pipes and components, resulting in a noisy water treatment system. Using the smaller vent channel 154 for the first air bleed state for a predefined time period allows the pressurized air to slowly bleed out, thus reducing noise in the water treatment system 10. The time periods for the first air bleed state and the second air bleed state can be defined so that the air bleed states are performed within a substantially minimum time frame that still allows optimum air bleeding without the adverse effects.

Figure 6:
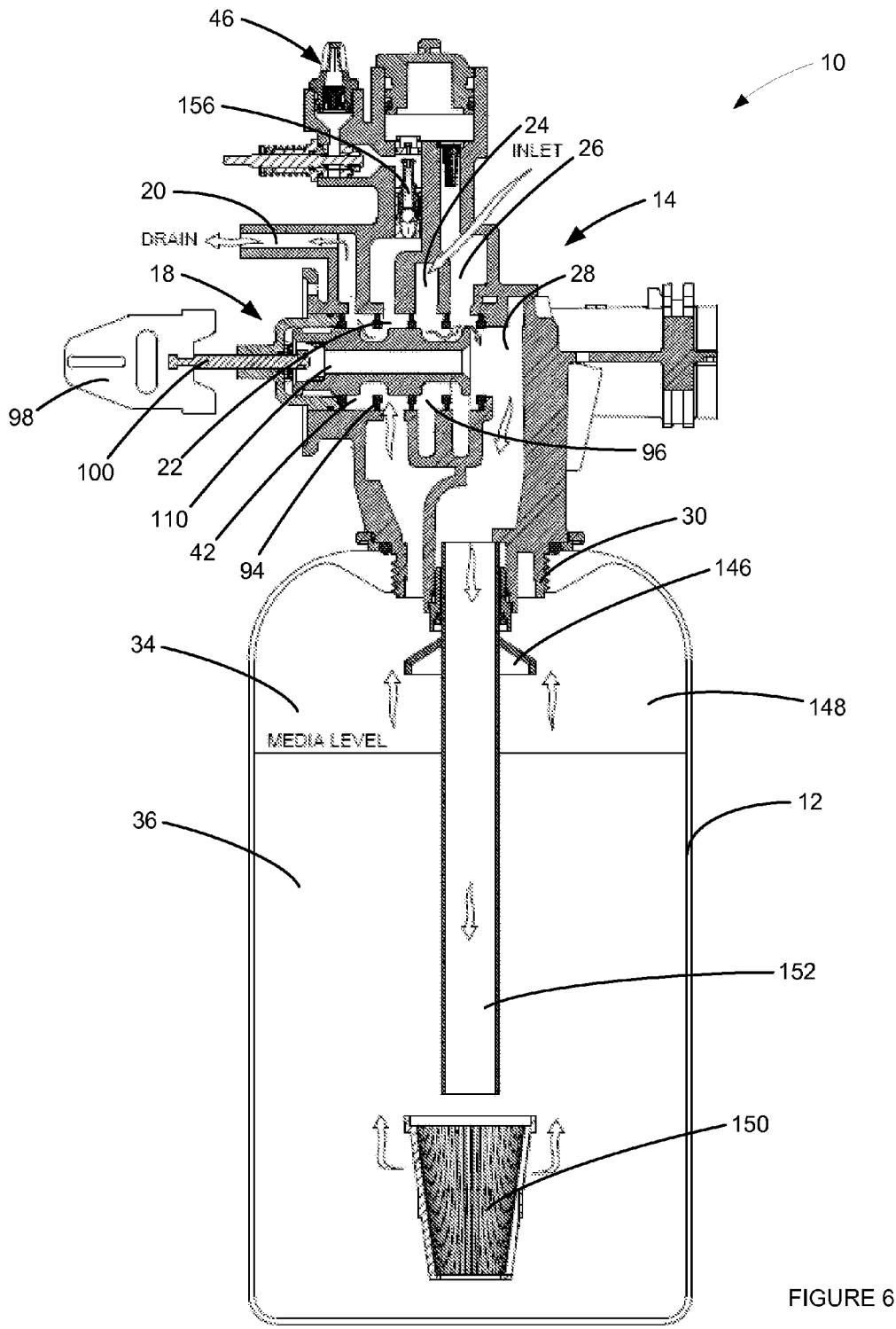
FIG. 6 is a cross-sectional view of the water treatment system of FIG. 1 in a backwash state.

The backwash state, as shown in FIG. 6, can follow the second air bleed state. In the backwash state, the piston 110 can be positioned further to the left such that the inlet 24 is in communication with the distributor 28 and the top portion 22 is in communication with the drain 20. Water from the inlet 24 can flow through the distributor 28 back into the tank 12 via the distributor pipe 152 and the second collector 150. The water layer 36 can then rise, thus lifting and agitating the filtration media 148 to carry particulates (i.e., the solid molecules) out of the tank 12 through the top portion 22 to the drain 20. In addition, as the water layer 36 rises, any air left in the tank 12 can be pushed out through the drain as well.

Figure 7:
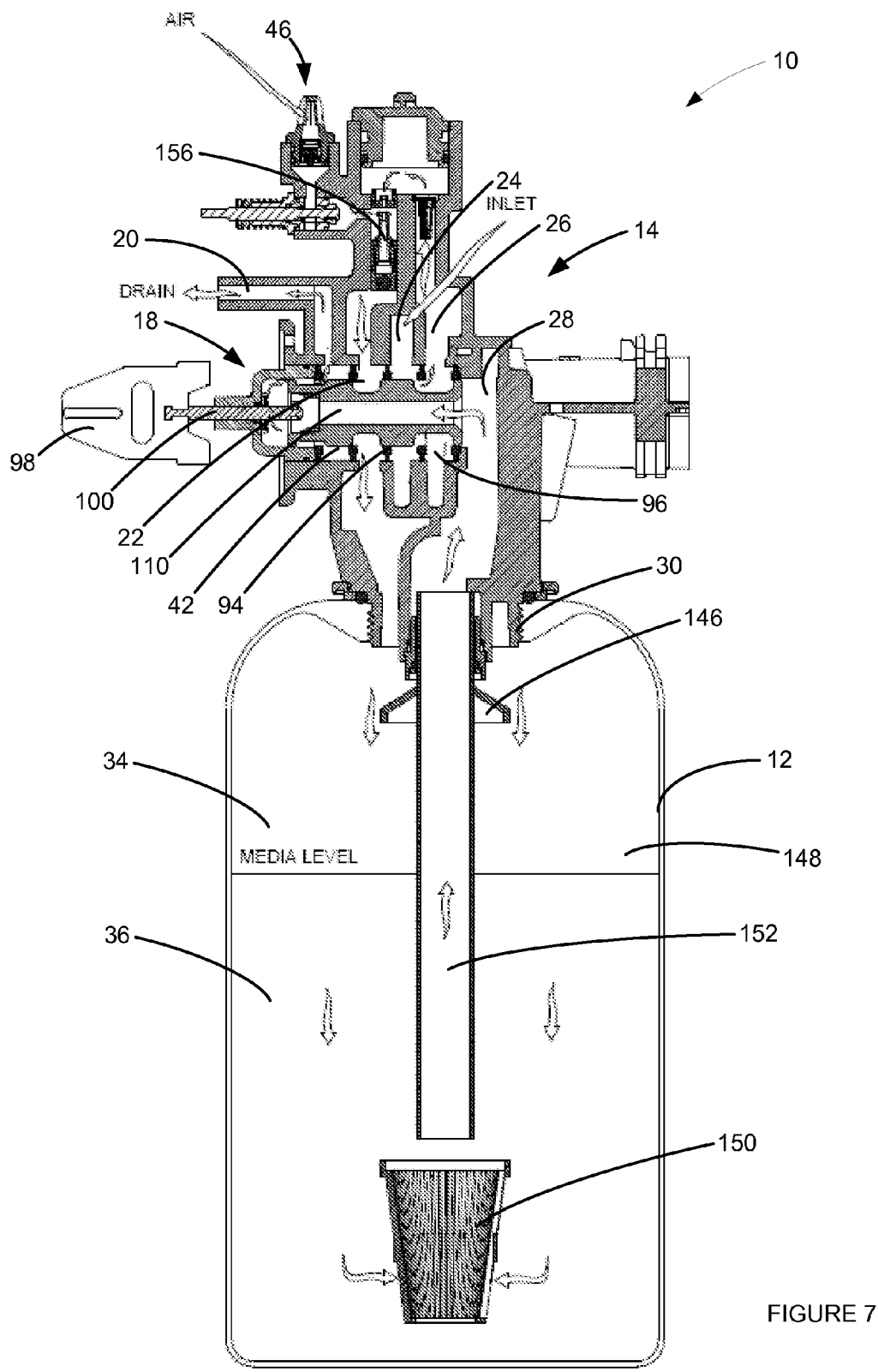
FIG. 7 is a cross-sectional view of the water treatment system of FIG. 1 in an air draw state.

FIG. 7 illustrates the water treatment system 10 in the air draw state. After the backwash state, air from the atmosphere (i.e., oxygenated air) can reenter the tank 12 to replenish the air layer 32 and to pack down the media layer 34. The air can enter the valve assembly 18 via the injector assembly 46. The air can then pass through a venturi assembly 156. The venturi assembly 156 can create a vacuum to draw the air and untreated water from the inlet 24 into the top portion 22. The air can mix with the untreated water traveling through top portion 22 and replenish the air layer 32 in tank 12. Once the air draw has been completed (i.e., the air layer 32 has a new supply of oxygen), the piston 110 can be repositioned back to the far right and the water treatment system 10 can return to the service state.

As shown in FIG. 8, the piston assembly 40 can be operated by an encoder 158, such as an optical encoder, in the powerhead 16. The encoder 158 can include an encoder shaft 160 coupled to, or integral with, an eccentric shaft 162. The eccentric shaft 162 can be coupled to the piston 110 by engaging a hole 164 in the link 98 (i.e., the link 98 of the piston assembly 40, as shown in FIG. 3). In some embodiments, the encoder 158 can include about 85 positioning slot/rib pairs and one homing slot/rib pair. The arrangement of the positioning slots/ribs can allow rotational control of the encoder 158 within about two-degree increments. The homing slot/rib pair can be used to stop rotation of the encoder 158. The full lateral movement of the piston 110 can be about 1.125 inches, with movement control in increments of about 0.013 inches, because motion translated from a rotational element (i.e., the encoder 158) to a linear element (i.e., the piston 110) creates a sinusoidal relationship between rotational control and linear control. The precise control by the encoder 158 can allow the piston 110 to create the small vent channels 154 with respect to the piston seals 94 during the first and the second air bleed states.

Figure 9:
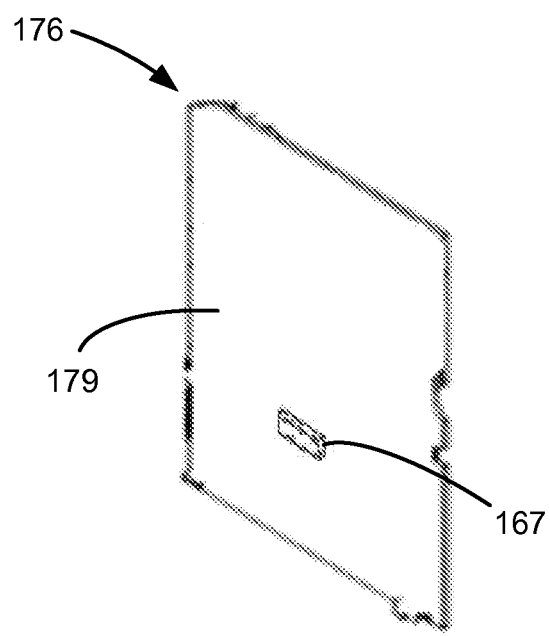
FIG. 9 is a back perspective view of a circuit board of the powerhead of FIG. 8.

Positional control of the encoder 158 can be provided through the use of a motor 166, an optical sensor 167 (shown in FIG. 9), and a controller 169 (such as a microcontroller, shown in FIG. 9). A motor drive gear 168 can be rotated by the motor 166 and can engage an encoder drive gear 170 to rotate the encoder 158. The motor 166 can be coupled to and supported by an upper support plate 172 with fasteners 174. The motor 166 can also be electrically connected to a circuit board 176 by a wire harness 178.

The controller 169 can be coupled to a front side 195 of the circuit board 176, as shown in FIG. 8. The optical sensor 167 can be separate or integral with the encoder 158 and can provide control inputs to the controller 169 regarding the position of the encoder 158. In one embodiment, the optical sensor 167 can be coupled to a back side 179 of the circuit board 176, as shown in FIG. 9. The motor 166 can receive control outputs from the controller 169 to adjust or maintain the position of the encoder 158. The optical sensor 167 can be positioned relative to the encoder 158 so that rotation of the encoder 158 via the motor 166 can alternately enable and disable the optical sensor's optical path.

The powerhead 16, as shown in FIG. 8, can also include a backplate 180, a cover 182, a display 184, a lower support plate 186, a switch 188, a cam 190, a transformer 192, and a meter cable 194. The backplate 180 and the cover 182 can enclose the components of the powerhead 16, including the motor 166, the circuit board 176, the encoder 158, etc. The display 184 can be coupled to the front side 195 of the circuit board 176 and controlled by the controller 169. A hole 196 in the cover 182 can allow a user to view the display 184. The lower support plate 186 can support the encoder 185 and the encoder drive gear 170. The switch 188 and the cam 190 can be supported by the upper support plate 172. The transformer 192 can be electrically connected to a conventional outlet to power the water treatment system 10 (e.g., through the controller 169). The meter cable 194 can be used to detect water flow to the tank 12 and can be electrically connected to the controller 169. In some embodiments, the controller 169 can trigger the regeneration stage after a predetermined amount of water flow to the tank 12, as detected by the meter cable 194. In other embodiments, the controller 169 can trigger the regeneration stage after a predetermined amount of time.

Figure 10:
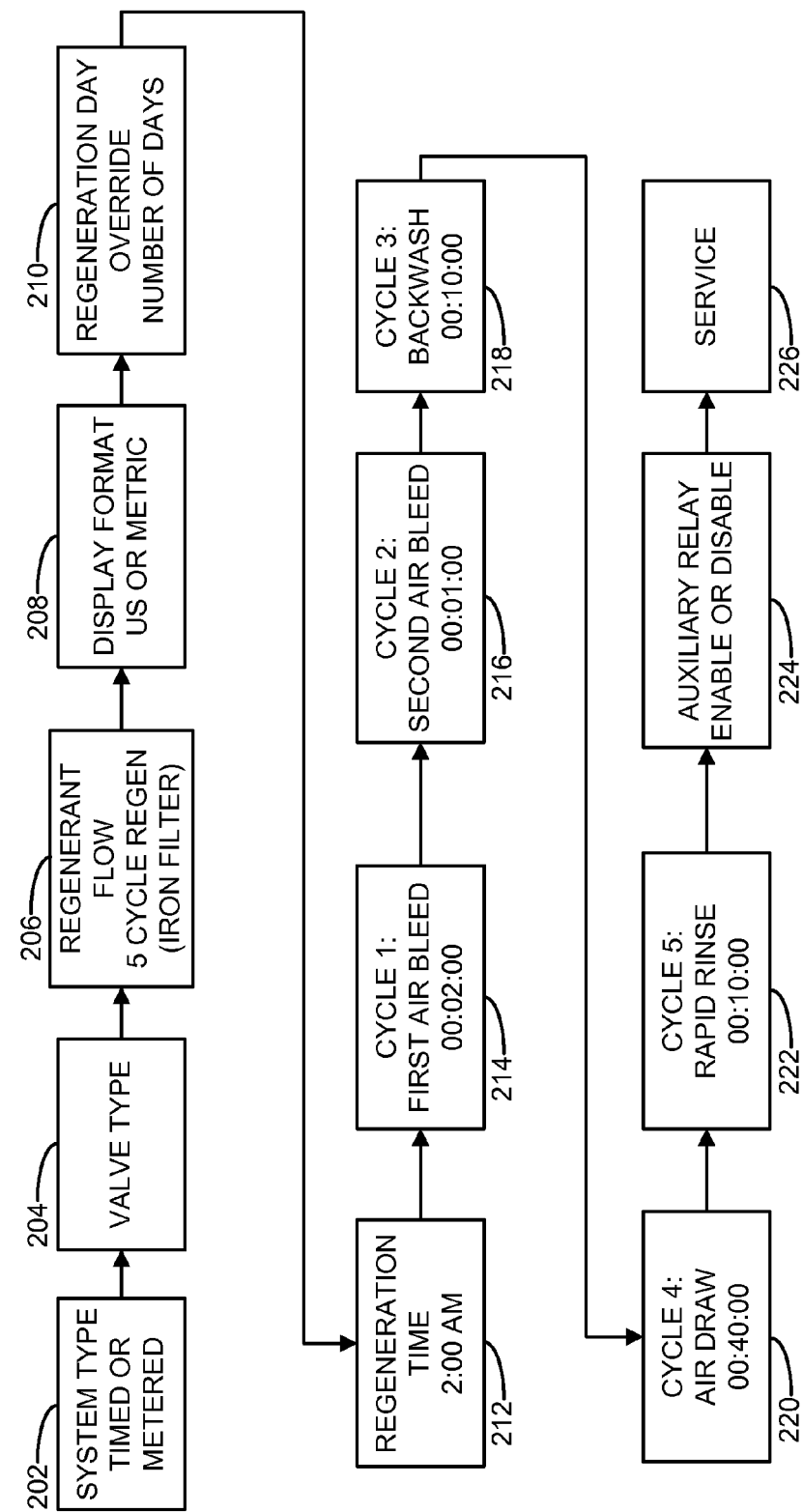
FIG. 10 is a block diagram of a user control method for a water treatment system according to one embodiment of the invention.

FIG. 10 illustrates a block diagram of a user control method for the water treatment system 10 according to one embodiment of the invention. The steps described below can be adjustable operational controls used by the controller 169 to operate the water treatment system 10. These steps can be displayed by the display 184 and a user can make adjustments accordingly by pressing buttons 198 on the circuit board 176 through button covers 200 on the cover 184. In one embodiment, these steps can be displayed during a "system setup" of the water treatment system 10. At step 202, the user can choose the system type, such as a timed system or a metered system. The timed system can trigger regeneration stages after predetermined lengths of time, while the metered system can trigger regeneration stages after predetermined amounts of water flow, as described above with reference to the meter cable 194. At step 204, the user can choose the valve type, for example by entering or choosing the type of valve assembly being used in the water treatment system 10. At step 206, the user can choose what type of regenerant flow is needed. For example, the user can choose a 5-cycle regeneration stage to be performed. At step 208, the user can choose whether information is displayed in metric (SI) or US units. At step 210, the user can choose a regeneration override time, for example, a number of days. A regeneration override can occur when the regeneration stage has not been triggered in a predetermined length of time (as designated by the user). At step 212, the user can choose a time of day the regeneration stage should be triggered. At step 214, the user can choose a time period, such as about 2 minutes, for the water treatment system 10 to operate at a first cycle (e.g., the first air bleed state). At step 216, the user can choose a time period, such as about 1 minute, for the water treatment system 10 to operate at a second cycle (e.g., the second air bleed state). At step 218, the user can choose a time period, such as about 10 minutes, for the water treatment system 10 to operate at a third cycle (e.g., the backwash state). At control step 220, the user can choose a time period, such as about 40 minutes, for the water treatment system 10 to operate at a fourth cycle (e.g., the air draw state). At step 222, the user can choose a time period, such as about 10 minutes, for the water treatment system 10 to operate at a fifth cycle (e.g., a rapid rinse state, often used for water softening). At step 224, the user can choose to enable or disable an auxiliary relay, such as an alarm. At control step, the user can choose to allow the water treatment system 10 to enter the service state (e.g., for the first time after installation).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of providing a regeneration stage in a water treatment system, the method comprising:
    pressurizing a tank by the addition of untreated water;
    entering a first air bleed state for a first time period to allow pressurized, deoxygenated air to exit the water treatment system;
    entering a second air bleed state for a second time period to equalize a first air pressure of remaining deoxygenated air inside the water treatment system with a second atmospheric air pressure outside the water treatment system;
    entering a backwash state for a third time period to expel the remaining deoxygenated air and particulates from inside the water treatment system; and
    entering an air draw state for a fourth time period to allow oxygenated air to enter the water treatment system.

2. The method of claim 1 and further comprising providing a valve assembly and a powerhead to operate the water treatment system in the first air bleed state, the second air bleed state, the backwash state, and the air draw state.

3. The method of claim 1 wherein the first time period is about 2 minutes.

4. The method of claim 1 wherein the second time period is about 1 minute.

5. The method of claim 1 wherein each one of the first time period, the second time period, the third time period, and the fourth time period is adjustable.

6. The method of claim 1 and further comprising removing at least one of iron, sulfide, and manganese using the water treatment system.

* * * * *